No. 876,598. PATENTED JAN. 14, 1908.
D. T. SHARPLES.
MILKING MACHINE.
APPLICATION FILED DEC. 5, 1906.
3 SHEETS—SHEET 1.
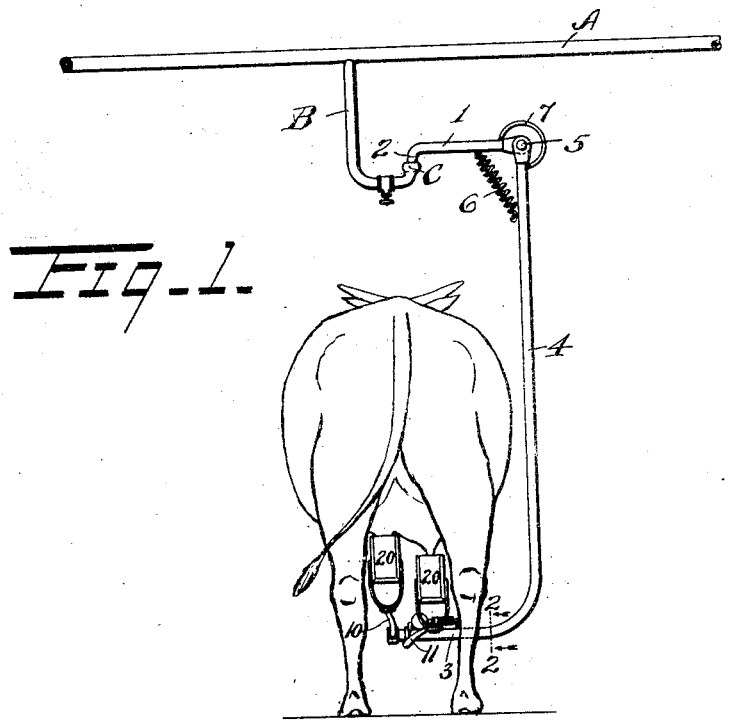
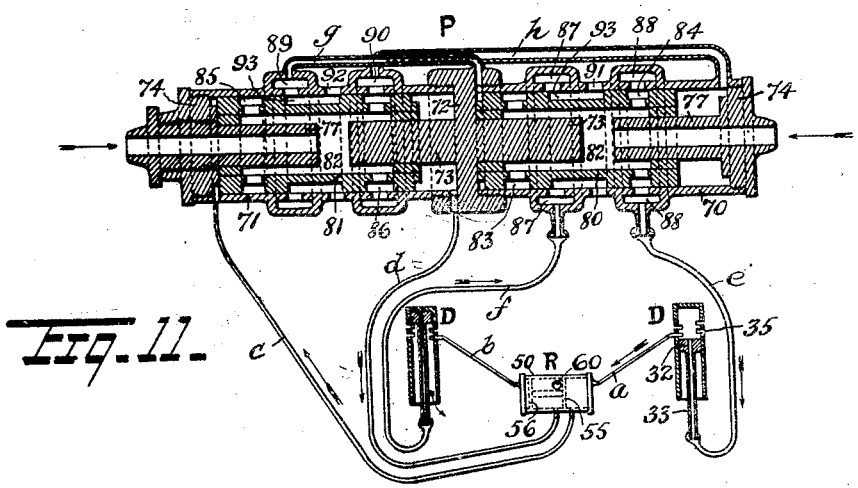
David T. Sharples Inventor

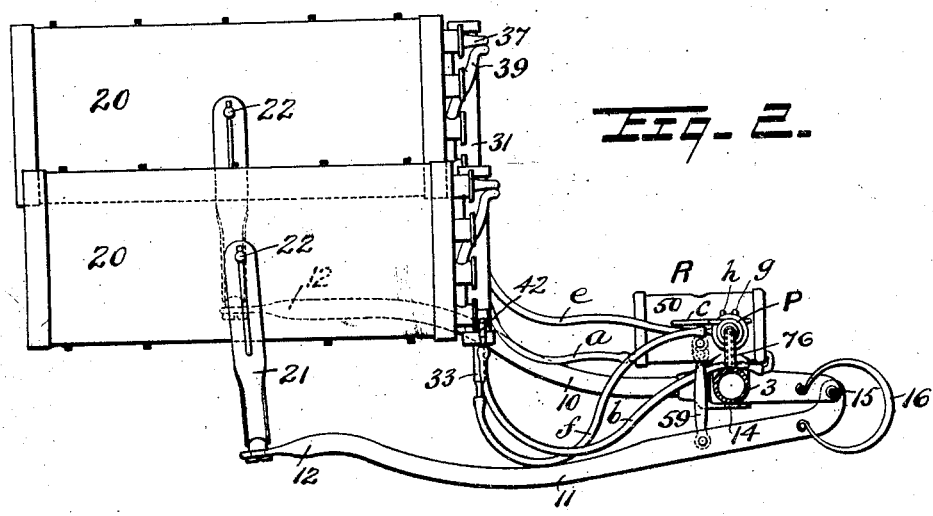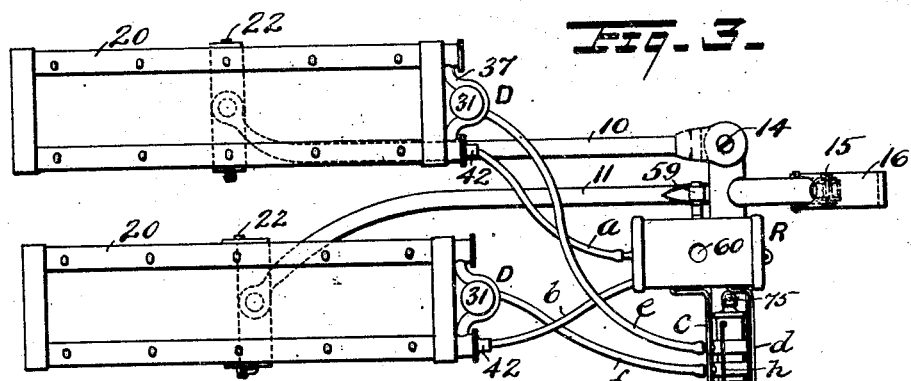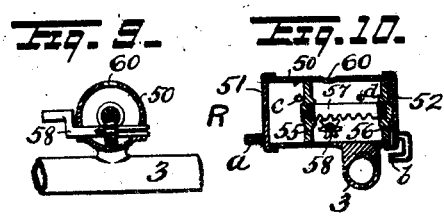

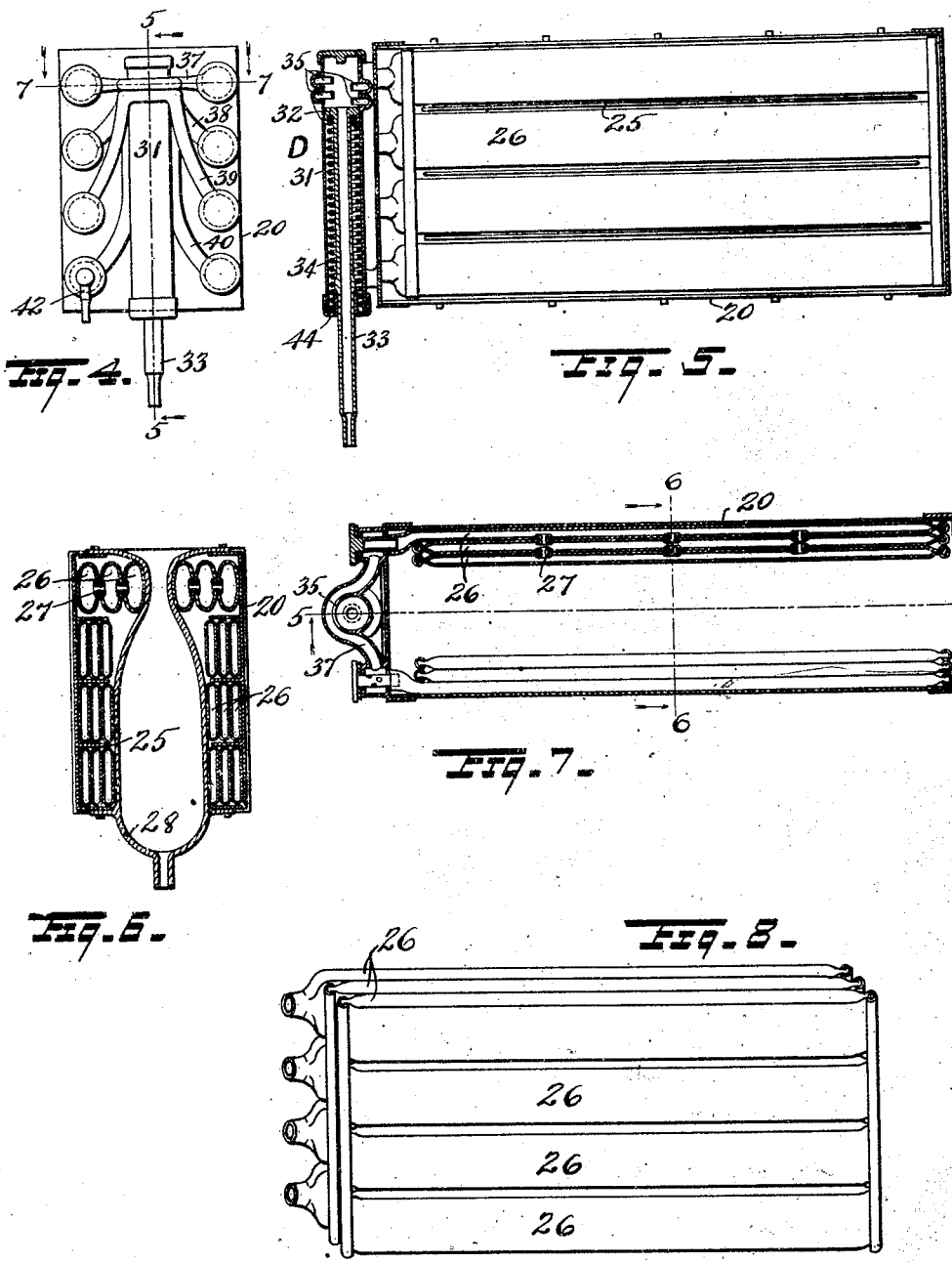

UNITED STATES PATENT OFFICE.

DAVID TOWNSEND SHARPLES, OF WEST CHESTER, PENNSYLVANIA.

MILKING-MACHINE.

No. 876,598.  Specification of Letters Patent.  Patented Jan. 14, 1908.

Application filed December 5, 1906. Serial No. 346,424.

*To all whom it may concern:*

Be it known that I, DAVID TOWNSEND SHARPLES, a citizen of the United States, and a resident of West Chester, in the county of Chester and State of Pennsylvania, have invented certain new and useful Improvements in Milking-Machines, of which the following is a specification.

My invention relates to that class of milking machines in which fluid-operated means are employed for the purpose of effecting manipulation of the teats substantially as in manual milking; and the invention consists in improved devices for producing the required manipulating actions, and in the coöperating arrangement, as fully described in connection with the accompanying drawings illustrating a preferred embodiment thereof, the novel features and combinations being particularly pointed out in the claims.

Figure 1 is an elevation showing my complete apparatus suspended in operative position from a fixed line of pipe forming a conduit for the actuating fluid, as compressed air. Fig. 2 is an enlarged elevation at right angles to Fig. 1, the tubular carrying-arm being shown in cross-section on the line 2—2 of said figure and the direction of view indicated by the arrow. Fig. 3 is a plan of the same, the vertical portion of the carrying-arm being broken away. Figs. 4, 5, 6, 7 and 8 illustrate in detail one of the double teat-presses, the distributer attached thereto, and one of the cumulatively inflatable pads shown separately. Figs. 9 and 10 show in detail the reciprocator for imparting opposite vertical movements to the two double teat-presses. Fig. 11 is an enlarged sectional view of the pulsator; there being indicated in connection therewith, diagrammatically, the distributers of the respective teat-presses, the reciprocator, and the communicating conduits, whereby the several coöperating movements are automatically effected, as required, by compressed air or other actuating medium.

In Fig. 1, A represents an overhead fixed line of compressed air piping, having a depending branch B for each cow stall, with a cut-off valve and a suitable bearing C upon which is removably suspended my milking mechanism; this mechanism being attached as shown to a carrying-arm the upper horizontal member 1 of which has its end 2 suitably seated in said fixed bearing C. This carrying-arm, as indicated, is adapted to serve as a conduit for the compressed air to the attached milking mechanism beneath the cow; its horizontal upper and lower members 1 and 3 respectively, and the connecting vertical portion 4 to one side of the cow, being tubular. To provide for adjustably balancing the weight of the attached mechanism beneath the cow the carrying-arm portions are jointed together at 5, and connected by a balancing spring 6 so as to permit the milking organs to operate upon different cows at varying heights as required; the conduit being preferably made continuous around the joint 5 by a connecting flexible tubing 7.

The lower horizontal member 3 of the carrying-arm is provided as shown with two teat-press members 10 and 11, on the adjacent outer ends 12, 12 of which are adjustably mounted similar teat-presses, each adapted as shown to engage two teats. The teat-press member 10 is secured to the carrying-arm at 14 in such manner as to be vertically rigid therewith, though capable of pivotal movement thereon in a horizontal plane as indicated, for the purpose of permitting the teat press carried thereby to be adjusted laterally relative to the other teat press, as may be required for different cows.
The other teat-press member 11 is pivoted to the carrying-arm at 15 so as to permit of its being swung thereon in a vertical plane, against a reacting spring 16.

Each teat press comprises a rigid casing 20 of rectangular form as shown and of a length sufficient to permit of its receiving two teats of any spacing; said casing being adjustably mounted upon the end 12 of either teat-press member 10 or 11, by means of an inverted bail 21 pivoted to the casing at 22, and capable of rotary adjustment on said arm end 12.

To provide for securing an effective pressing action upon the teats, it is essential in the first place that the base of the teat be fully compressed at each recurring action; that this preliminary closure of the teat be effected as near the udder as practicable; and that the remaining portion of the teat be progressively compressed to its extremity so as to positively and freely discharge the milk. In attempts heretofore to operate upon the teats by means of fluid-inflated presses, this action has failed of being attained, as I have found by experiment, mainly for this reason: That the movement of the compressing surface required to produce a proper degree of compression of a teat, involves the use of inflatable wall sections of too great diameter when inflated and too great width when collapsed, to permit of securing a preliminary closure of the teat sufficiently close to its base and sufficiently limited in extent, to make further compressing action upon the teat practically effective in discharging the milk. An essential feature therefore of a practically operative machine of this class, and a main feature of my invention, consists in providing an inflatable teat-press lining adapted to combine with a sufficient teat-compressing movement when inflated, a proper locating of such pressure as above explained; the embodiment of such feature being indicated in detail in Figs. 4 to 8.

The teat-press shell or casing 20 as shown is provided with a series of shelves or partitions 25 projecting toward each other from the opposite side walls. Between these shelves or partitions are provided separate inflatable fingers, placed one above another, and each of which, as shown, is removably secured therein and formed of laterally superposed inflatable pads 26, 26, 26, united by eyelets 27 affording communication between them; so that when jointly inflated the united pads 26 will each tend to assume a tubular form and thereby cumulatively project from the side wall of the casing a distance equal to the sum of their diameters, while when deflated they will flatten together between the rigid shelves or partitions 25. These vertically superposed fingers thus form inflatable lining sections upon the opposite side walls of the casing, between which when deflated, the teats may be readily passed, but which serve, when inflated, to closely compress the inserted teats; the expansion of the fingers laterally, or their projection from the fixed wall of the casing, being amply sufficient to effect full compression of the teats notwithstanding the relative narrowness of the fingers required to properly limit the extent of their grip upon the teat. A suitable milk-bag 28 is placed between the opposing inflatable fingers; and removably secured to the top of the casing so as to provide for readily cleaning and replacing the same.

The inflating medium, as compressed air, is supplied to the several fingers or sections of the opposite inflatable linings of each teat press, by means of a distributer device D fixed to the end of the casing. This device comprises, as shown, a cylinder 31 provided with a hollow piston and rod 32, 33 through which the compressed air is admitted above the piston, as hereafter described, so as to depress the latter against the tension of a long spiral spring 34. This downward movement of the piston opens in succession a series of cylinder ports 35 corresponding in number with the lining sections or fingers and respectively connected with the latter by the several paired conduits 37, 38, 39 and 40, and connecting nipples through the casing wall into the respective sections or fingers; the distribution being thus effected, first to the upper fingers to compress the base portions of the inserted teats, and thereafter in succession to the lower sections or fingers; each pair of sections or fingers being inflated before the next lower cylinder port is opened. The lowermost lining section or finger is provided with a conduit connection 42, to a reciprocator device as hereafter described; and the lower head of the distributer cylinder 31 is provided with an exhaust opening 44 hereafter referred to.

Fixed to the lower horizontal portion of the carrier arm is a pulsator device P and a reciprocator device R. The latter comprises a cylinder 50 with opposite heads 51 and 52 connected respectively by conduits $a$ and $b$ with the connections 42 of the lowermost inflatable sections or fingers of the two teat presses and the port 35 therefor. Within this cylinder is a double piston the spaced heads 55 and 56 of which are connected by a toothed rod 57 which imparts rocking movement to a transverse crank shaft 58. This crank shaft is connected by a rod 59 to the vertically hinged teat-press member 11 of the carrying arm; and its rocking action serves to impart to the two teat presses reverse relative up and down movements properly timed to the alternate pressing and releasing actions of said teat presses, as hereafter referred to. An intermediate exhaust opening 60 is provided in the cylinder 50, and outlet conduits $c$ and $d$, near either end, communicate with the pulsator device.

The pulsator, as shown, comprises a main cylinder 70 and a secondary cylinder 71, arranged tandem, divided by an intermediate solid partition 72 having oppositely extending hubs 73, 73; and opposite heads 74, 74 which are mounted in hollow standards 75 and 76 on the tubular carrier arm 3; said hollow standards serving, in connection with central passage-ways in the cylinder heads and their inner hubs 77, 77, to constantly supply compressed air to similar hollow pistons 80 and 81 in the respective cylinders. Each of these pistons has bored ends fitted to ride upon a partition hub 73 and a cylinder-head hub 77 respectively, and its intermediate compressed-air chamber 82 is provided with similar wall openings near opposite ends marked respectively 83 and 84 in piston 80, and 85 and 86 in piston 81. Each of the cylinders 70 and 71 is provided with two wall ports marked respectively 87 and 88 in cylinder 70, and 89 and 90 in cylinder 71, which ports in each case are alternately thrown into communication with their piston chamber 82 at opposite extremes of its movement; while at the same times the other port is thrown into communication with an intermediate exhaust opening, marked 91 and 92 on the respective cylinders, through a circumferential groove 93 formed midway of each piston.

The communicating connections between different points of the pulsator cylinders, and to the teat-press distributers D D and the reciprocator R, are indicated diagrammatically in Fig. 11, and the coöperative arrangement of the whole mechanism will be made clear mainly by reference thereto; the detailed operation of the parts indicated diagrammatically, being borne in mind as previously described.

With the pulsator pistons positioned as indicated in Fig. 11 it will be seen that compressed air is being supplied from the chamber 82 of piston 80, through ports 84 and 88 and conduit $e$, to the right hand distributer D; that the piston 32—33 in said distributer has been fully depressed, all of the fingers or lining sections of the connected teat press inflated, and the supply of air carried therefrom through the conduit $a$ into the reciprocator R, where it has moved the reciprocator piston to the left, thereby depressing said right hand teat press while it is at the same time compressing the teats. Referring now to the left hand teat press and its distributer D, the piston of the latter is represented as raised above the ports 35, so that all of the fingers or lining sections have been deflated by exhausting through the lower cylinder head; thus permitting the upward movement of this teat press against the udder preliminary to a new pressing action, while the active right hand teat press was being moved downward as previously stated. It will be noticed that the pressure on the top of this left hand distributer piston has been relieved so as to permit it to be thus raised above the ports by its spring, because of the partial exhaust from the successive lining sections or fingers which is effected through the hollow distributer piston-and-rod, the conduit $f$ to the port 87, and finally the exhaust opening 91 of the pulsator cylinder 70.

The automatic operation of the pulsator to reversely operate the teat presses is as follows: It will be noticed that the right hand end of the reciprocator cylinder, as indicated in Fig. 11, is in communication through conduit $c$ with the outer end of the pulsator cylinder 71 so as to deliver compressed air to the latter and thereby move the piston-valve 81 from the position in which it is shown; the opposite end of said cylinder 71 being at the same time exhausted through conduit $d$ and the reciprocator cylinder opening 60. The piston-valve 81 being thus moved, effects a corresponding movement of the main piston-valve 80 as follows: The chamber 82 of piston-valve 81, is thrown into communication, through port openings 85, 89, and conduit $g$, with the left hand end of the main pulsator cylinder 70, to move the piston-valve 80; the right hand end of said cylinder being at the same time exhausted through conduit $h$ and ports and passageways 90, 93 and 92. The pulsator-valve 80 being thus reversed in position from that indicated in Fig. 11, the reversed operation of the respective teat presses, as heretofore described, is effected; the alternating movements being of course repeated until the air supply is cut-off at completion of the milking operation.

Having thus fully described the essential features of my invention in connection with the preferred embodiment of the same indicated in the drawings, I do not desire to unduly limit myself to specific mechanism which may be readily modified, but:—

What I claim is:—

1. A fluid-actuated milking mechanism comprising a pair of teat-presses each provided with inflatable wall sections and fluid distributers therefor, a pulsator device arranged to supply the inflating medium to said distributers alternately, and a reciprocator device arranged to be operated by said medium after its passage through the wall sections, substantially as set forth.

2. A fluid-actuated milking mechanism comprising a pair of teat-presses provided respectively with inflatable wall sections and fluid distributers, a carrying-arm for said presses having a vertically swinging member to which one of them is attached, and pulsator and reciprocator devices on said arm substantially as set forth.

3. In a fluid-actuated milking mechanism the combination with inflatable teat-presses, of a pulsator comprising a main fluid-cylinder having separate valve-controlled ports communicating respectively with said inflatable presses and with an exhaust, and a secondary valved cylinder having separate conduits communicating with said inflatable presses and serving to control the main fluid-cylinder substantially as set forth.

4. In a fluid-actuated milking mechanism the combination with reciprocatively mounted inflatable teat-presses, of a pulsator comprising a main fluid-cylinder having separate valve-controlled ports communicating respectively with said inflatable presses and with an exhaust, and a secondary valved cylinder having separate conduits communicating with said inflatable presses and serving to control the main fluid-cylinder, said conduits being intermediately connected to a reciprocator device having a cut-off piston arranged to simultaneously impart relative reciprocating movement to the teat-presses.

5. In a fluid-operated milking mechanism, a teat press having a casing provided with a side wall lining comprising a plurality of inflatable pads arranged side by side to form a single pressing finger, said pads being adapted to cumulatively expand when inflated.

6. In a fluid-operated milking mechanism, a teat press having a casing provided with a side wall lining comprising a plurality of communicating inflatable pads arranged side by side to form a single pressing finger, said pads being adapted to cumulatively expand when inflated.

7. In a fluid-operated milking mechanism, a teat press having a casing provided with a side wall lining made up of separate finger sections each comprising a plurality of cumulatively inflatable pads.

8. In a fluid-operated milking mechanism a teat press having a casing provided with opposite wall linings each of which is made up of superposed inflatable finger sections and a distributer for the inflating medium whereby opposing sections are jointly inflated in succession.

9. In a fluid-operated milking mechanism, a teat press having a casing provided with opposite wall linings made up of inflatable sections each section comprising a plurality of cumulatively expansible pads and a distributer for the inflating medium whereby said sections are independently inflated successively.

10. In a fluid-operated milking mechanism a teat press having an inflatable wall lining adapted to laterally compress an interposed teat without inclosing the same and a removable milk-bag adapted to inclose the teat and deliver the milk therefrom.

11. In a milking mechanism the combination with a teat press having opposite walls adapted to close together upon an interposed teat without inclosing the same, of a milk bag removably located between said walls substantially as set forth.

12. In a fluid-operated milking mechanism a teat press having a casing provided with a wall lining made up of inflatable sections each section comprising a plurality of cumulatively expansible pads and a distributer for the inflating medium whereby said sections are independently inflated successively.

13. An inflatable teat-press lining comprising inflatable finger sections the projection of which when expanded is greater than their width.

14. An inflatable teat-press lining comprising inflatable finger sections the projection of which, when expanded, is greater than their width, and when collapsed is less than their width.

15. In a fluid-operated milking mechanism, a teat press having a casing provided with opposite walls having spaced shelves, inflatable pads carried on said shelves, and a distributer device for the inflating medium fixed to one end of the casing and having separate ports arranged in communication with the several pads substantially as set forth.

16. In a milking mechanism a teat-press carrying-arm having separate press-carrying members one of which is arranged to swing in a horizontal plane for lateral adjustment of the presses, and the other in a vertical plane during the milking operation.

17. In a milking mechanism a teat-press carrying-arm having a horizontally adjustable press-carrying member and a vertically reciprocated press-carrying member.

18. In a milking mechanism a teat-press carrying-arm having a horizontally adjustable press-carrying member and a vertically reciprocated press-carrying member, and separate teat presses adjustably mounted upon said members.

19. In a milking mechanism a teat-press carrying-arm having a pivoted press-carrying member arranged to swing in a vertical plane, and reciprocating means for said member carried by the main arm and arranged to operate in unison with the teat-pressing means substantially as set forth.

20. In a milking mechanism the combination with a fixed arm-bearing, of a teat-press carrying-arm suspended therefrom and provided with a vertically rigid teat-press member and a vertically reciprocating teat-press member.

21. In a milking mechanism the combination with a fixed arm-bearing, of a teat-press carrying-arm suspended therefrom and provided with a vertically rigid but horizontally adjustable member and a vertically reciprocating member, and separate teat presses adjustably mounted upon said members.

22. In a milking mechanism the combination with a fixed arm suspension bearing, of a spring-jointed carrying-arm suspended therefrom and provided with a vertically rigid teat-press member and a vertically reciprocating teat-press member.

23. In a fluid-actuated milking mechanism, the combination with a fixed conduit having an arm-suspension bearing, of a carrying-arm suspended therefrom, and milking organs and operating mechanism therefor mounted on said arm and arranged in communication with said fixed conduit.

24. In a fluid-actuated milking mechanism, the combination with a fixed conduit having an arm suspension bearing, of a spring-jointed carrying-arm suspended therefrom, and milking organs and operating mechanism therefor mounted on said arm and arranged in communication with said fixed conduit.

25. In a fluid-actuated milking mechanism, the combination with a fixed conduit having an arm suspension bearing, of a spring-jointed conduit carrying-arm suspended therefrom and milking organs and operating mechanism therefor mounted on said arm and communicating therethrough with said fixed conduit.

26. In a fluid-actuated milking mechanism the combination with a fixed conduit having an arm suspension bearing, of a carrying-arm suspended therefrom, inflatable teat-presses reciprocatively mounted on said arm, and fluid-actuated devices on the latter arranged in communication with said fixed conduit and adapted to coöperatively inflate and reciprocate said teat-presses.

27. In a fluid-actuated milking mechanism the combination with a fixed conduit having an arm suspension bearing, of a spring-jointed carrying arm suspended therefrom, inflatable teat-presses reciprocatively mounted on said arm, and fluid-actuated devices on the latter arranged in communication with said fixed conduit and adapted to coöperatively inflate and reciprocate said teat-presses.

28. In a fluid-actuated milking mechanism the combination with a fixed conduit having an arm suspension bearing, of a spring-jointed conduit carrying a suspension bearing therefor, inflatable teat-presses reciprocatively mounted on said arm, and fluid-actuated devices on the latter communicating therethrough with said fixed conduit and adapted to coöperatively inflate and reciprocate said teat-presses.

29. In a fluid-actuated milking mechanism the combination with a fixed conduit having an arm-suspension bearing, of a carrying-arm suspended therefrom, and provided with milking organs and operating mechanism therefor, said arm having spring-jointed conduit members and a flexible tubing around the pivoted connection.

In testimony whereof, I affix my signature; in the presence of two witnesses.

DAVID TOWNSEND SHARPLES.

Witnesses:
H. B. CARLISLE,
G. I. DAISEY.